United States Patent
Kawara

(10) Patent No.: US 11,972,208 B2
(45) Date of Patent: Apr. 30, 2024

(54) INFORMATION PROCESSING DEVICE AND INFORMATION PROCESSING METHOD

(71) Applicant: CANON KABUSHIKI KAISHA, Tokyo (JP)

(72) Inventor: Satoshi Kawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 16/928,447

(22) Filed: Jul. 14, 2020

(65) Prior Publication Data

US 2021/0019554 A1 Jan. 21, 2021

(30) Foreign Application Priority Data

Jul. 18, 2019 (JP) ................. 2019-132818

(51) Int. Cl.
| | | |
|---|---|---|
| *G06F 40/242* | (2020.01) | |
| *G06F 18/22* | (2023.01) | |
| *G06F 40/279* | (2020.01) | |
| *G06V 30/148* | (2022.01) | |
| *G06V 30/262* | (2022.01) | |
| *G06V 30/10* | (2022.01) | |
| *G06V 30/40* | (2022.01) | |

(52) U.S. Cl.
CPC ............ *G06F 40/242* (2020.01); *G06F 18/22* (2023.01); *G06F 40/279* (2020.01); *G06V 30/153* (2022.01); *G06V 30/262* (2022.01); *G06V 30/10* (2022.01); *G06V 30/40* (2022.01)

(58) Field of Classification Search
None
See application file for complete search history.

(56) References Cited

U.S. PATENT DOCUMENTS

| | | | |
|---|---|---|---|
| 7,162,086 B2 | 1/2007 | Ikeda | |
| 9,256,795 B1* | 2/2016 | Gray | G06V 20/20 |
| 9,305,226 B1* | 4/2016 | Yuan | G06V 30/268 |
| 9,582,740 B2 | 2/2017 | Kubota et al. | |
| 9,727,804 B1* | 8/2017 | Lapointe | G06V 30/268 |
| 10,621,237 B1* | 4/2020 | Rathnavelu | G06F 16/313 |

(Continued)

FOREIGN PATENT DOCUMENTS

| | | |
|---|---|---|
| JP | H0589281 A | 4/1993 |
| JP | 2004046315 A | 2/2004 |

(Continued)

OTHER PUBLICATIONS

Dong, Rui, and David A. Smith. "Multi-input attention for unsupervised OCR correction." In Proceedings of the 56th Annual Meeting of the Association for Computational Linguistics (vol. 1: Long Papers), pp. 2363-2372. 2018. (Year: 2018).*

*Primary Examiner* — Frank D Mills
(74) *Attorney, Agent, or Firm* — ROSSI, KIMMS & McDOWELL LLP

(57) ABSTRACT

The present disclosure determines whether or not a character string of a result obtained by a character recognition process matches a word of a word dictionary; and when a pattern that is similar to a predefined arrangement pattern of a character type is present in the character string of the result obtained by the character recognition process that is determined not to match a word of the word dictionary, changes the character recognition process for the character string based on the pattern.

6 Claims, 11 Drawing Sheets

(56) References Cited

U.S. PATENT DOCUMENTS

| | | | |
|---|---|---|---|
| 10,769,200 B1 * | 9/2020 | Lin | G06V 40/20 |
| 10,963,717 B1 * | 3/2021 | Corcoran | G06V 30/1916 |
| 2004/0086179 A1 * | 5/2004 | Ma | G06V 30/268 |
| | | | 382/177 |
| 2012/0039536 A1 * | 2/2012 | Dejean | G06V 30/12 |
| | | | 382/176 |
| 2017/0372161 A1 * | 12/2017 | Almeida | G06V 10/811 |
| 2018/0107892 A1 * | 4/2018 | Istenes | G06V 10/809 |

FOREIGN PATENT DOCUMENTS

| | | |
|---|---|---|
| JP | 2010102668 A | 5/2010 |
| JP | 2014170452 A | 9/2014 |
| JP | 2015138396 A | 7/2015 |
| JP | 2016201013 A | 12/2016 |

* cited by examiner

FIG. 9

| | | | | | | | | | | | | | | | |
|---|---|---|---|---|---|---|---|---|---|---|---|---|---|---|---|
| T | 90% | | | | | | | | | | | 9 | 90% | | |
| | | 2 | 80% | | | 1 | 75% | — | 70% | 0 | 80% | 8 | 80% | | |
| | | | | 1 | 70% | | | | | O | 70% | S | 70% | S | 70% |
| | | | | I | 60% | I | 60% | | | O | 60% | | | 3 | 60% |
| | | Z | 50% | I | 50% | | | — | 50% | | | 6 | 50% | g | 50% | 8 | 50% |
| T | 40% | | | | | I | 40% | — | 40% | | | | | S | 40% |
| | | S | 30% | I | 30% | I | 30% | _ | 30% | | | | | 0 | 20% |
| | | | | | | | | | | o | 20% | 8 | 20% | | |
| V | 10% | s | 10% | | | | | | | | | 0 | 10% | | |

FIG. 10

| [٣] | 90% | [0-9] |     | [0-9] |     | [0-9] | 75% |     | [0-9] | 70% | [0-9] |     | [0-9] |     | [0-9] |     | [A-Z] |     |
|-----|-----|-------|-----|-------|-----|-------|-----|-----|-------|-----|-------|-----|-------|-----|-------|-----|-------|-----|
| [٣] |     | [0-9] | 80% | [0-9] |     | [0-9] |     |  —  | [0-9] |     | [0-9] | 80% | [0-9] |     | [0-9] |     | [A-Z] |     |
| [٣] |     | [0-9] |     | [0-9] | 70% | [0-9] |     |  —  | [A-Z] | 70% | [0-9] | 80% | [0-9] |     | [A-Z] |     | [A-Z] | 70% |
| [٣] |     | [0-9] |     | [A-Z] | 60% | [A-Z] | 60% |  —  | [A-Z] | 60% | [A-Z] | 70% | [0-9] |     | [0-9] |     | [0-9] | 60% |
| [٣] |     | [0-9] | 50% | [A-Z] | 50% | [A-Z] |     |  —  | [A-Z] |     | [A-Z] |     | [0-9] |     | [A-Z] | 50% | [0-9] | 50% |
| [A-Z] | 40% | [A-Z] |     | [A-Z] |     | [A-Z] | 40% |  —  | [A-Z] | 40% | [A-Z] |     | [0-9] | 50% | [A-Z] |     | [A-Z] | 40% |
| [A-Z] |     | [A-Z] | 30% | [A-Z] | 30% |  —  | 30% |  —  |  ∘   | 30% | [0-9] |     | [A-Z] |     | [0-9] | 20% | [0-9] | 20% |
| [A-Z] |     | [A-Z] |     |  —  |     |  —  |     |  —  |  ∘   | 20% | [0-9] |     | [A-Z] |     | [0-9] |     | [0-9] |     |
| [A-Z] | 10% | [A-Z] | 10% |  —  |     |  —  |     |  —  |       |     | [0-9] |     | [0-9] |     | [0-9] | 10% | [0-9] |     |

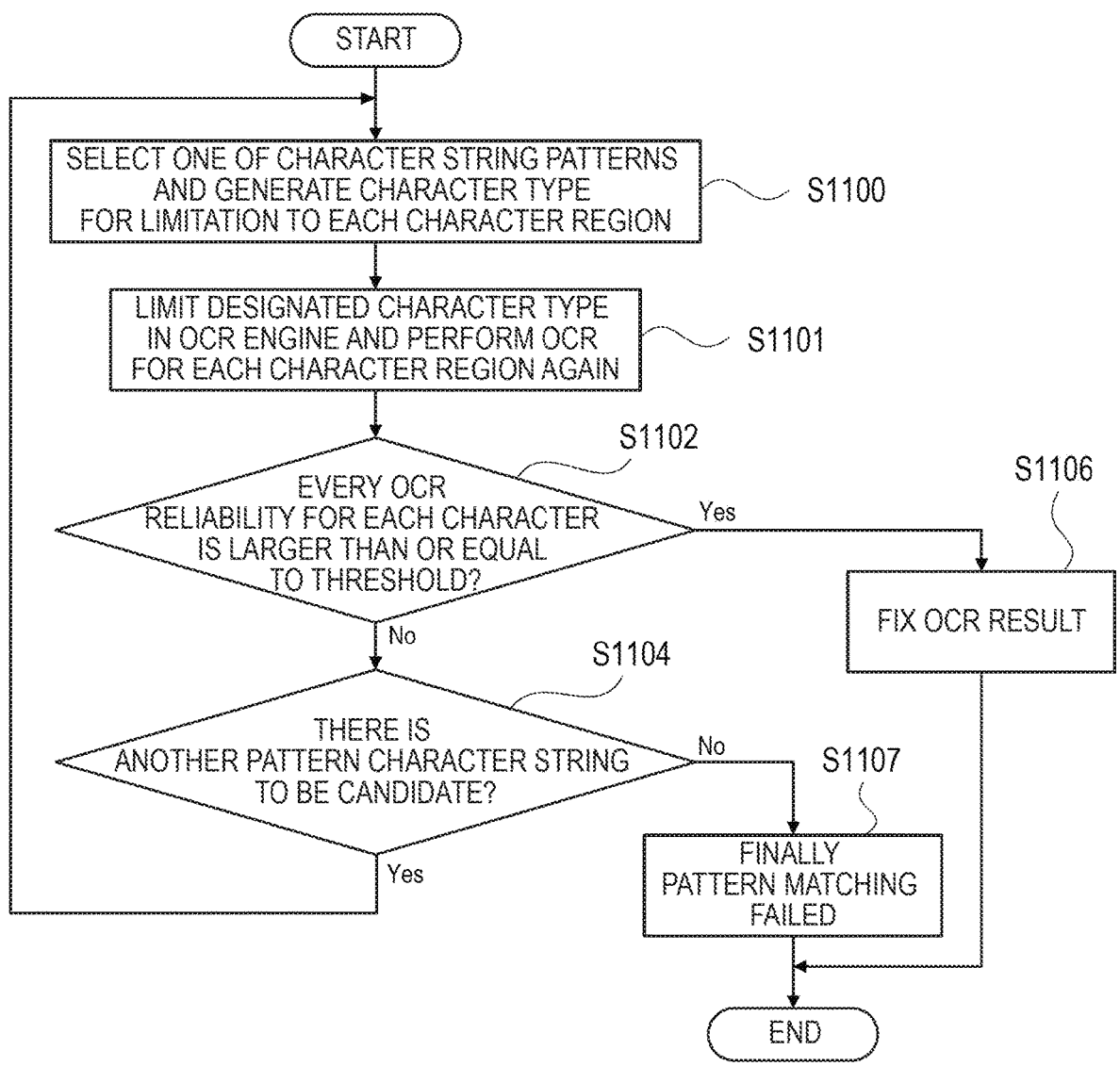

INFORMATION PROCESSING DEVICE AND INFORMATION PROCESSING METHOD

BACKGROUND OF THE INVENTION

Field of the Invention

The aspect of the embodiments relates to an information processing device and an information processing method.

Description of the Related Art

Conventionally, a method of converting a report and a general document into image data by using a copying machine or a scanner and performing optical character recognition (OCR) processing on the content of the manuscript is known. There is a method referred to as "word matching" to match a candidate character predicted by OCR processing with a predefined word list and find a word character string. Further, as a method of improving OCR accuracy for individual characters, a method of performing English OCR processing on characters including preceding and subsequent alphanumeric characters, when an alphanumeric character is found by Japanese OCR processing is considered in Japanese Patent Application Laid-Open No. 2004-046315.

According to the word list described above in particular, by registering a known word, for example, a client name list that may appear in a report in advance, it is possible to perform a correction process of finding a correct answer even when OCR accuracy is slightly low. In a report or the like in particular, however, it may be difficult to perform the method taking a process of extracting a specific item by OCR processing into consideration. For example, in a request report of a repair service, it is assumed that a serial number of repaired articles (for example, "IXP089OP: 3208Q", "E86IL1103IO", "0x32-0333-3083A6", or the like) is described, and the character string is intended to be read. It is difficult to register a character string such as a serial number (a character string that is different from common words) in a word list. However, since it is important to manage a serial number, accuracy of OCR processing is important. A character strings having such a nature covers a wide variety of character strings such as member ID, patient ID, or the like in addition to the above, and all of them are important information in a report.

SUMMARY OF THE INVENTION

One embodiment of the present disclosure determines whether or not a character string of a result obtained by a character recognition process matches a word of a word dictionary; and when a pattern that is similar to a predefined arrangement pattern of a character type is present in the character string of the result obtained by the character recognition process that is determined not to match a word of the word dictionary, changes the character recognition process for the character string based on the pattern.

Further features of the present invention will become apparent from the following description of exemplary embodiments with reference to the attached drawings.

BRIEF DESCRIPTION OF THE DRAWINGS

FIG. 9 is a diagram illustrating an OCR result and reliability.

FIG. 10 is a diagram illustrating a relationship between OCR reliability and a character string pattern.

FIG. 11 is a detailed flowchart of step S310 of FIG. 3.

DESCRIPTION OF THE EMBODIMENTS

First Embodiment

System Configuration

Figure 1:
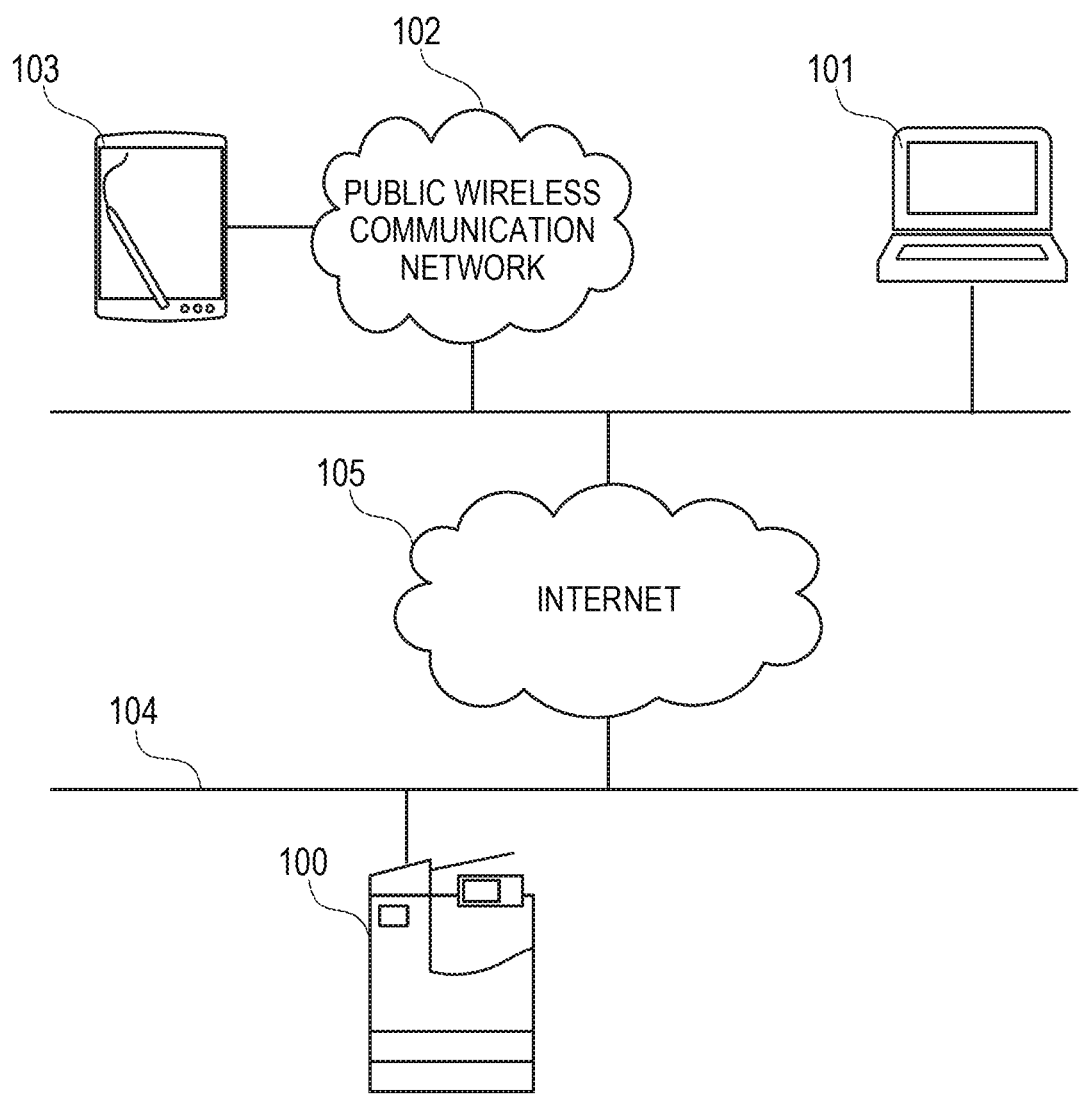
FIG. 1 is a diagram illustrating an example of a system configuration of an image processing system.

FIG. 1 is a diagram illustrating an example of a system configuration of an image processing system. As illustrated in FIG. 1, an image processing device 100 and a PC/server terminal 101 are connected to a LAN 104 formed of the Ethernet (registered trademark), a wireless LAN, or the like and are connected to the Internet 105. Further, a mobile terminal 103 is connected to the Internet 105 from a public wireless communication network 102 or the like. The image processing device 100, the PC/server terminal 101, and the mobile terminal 103 are connected to the Internet 105 from the LAN 104 or the public wireless communication network 102 and can communicate with each other. Any one of the PC/server terminal 101 and the mobile terminal 103 may be configured to be included in an image processing system. The image processing device 100 may further perform a process implemented by any one of or both of the PC/server terminal 101 and the mobile terminal 103.

The image processing device 100 is a copying multifunctional device having an operation unit, a scanner unit, and a printer unit. In a system of the present embodiment, the image processing device 100 is used as a scan terminal that reads a plurality of manuscripts such as name cards, licenses, postcards, or the like. In particular, in the present embodiment, the image processing device 100 is used as a scan terminal that reads a plurality of receipts. The image processing device 100 further performs a multi-crop process of extracting a manuscript image from a scanned image obtained by reading manuscripts on a manuscript basis. The image processing device 100 further has a display unit and an operation unit such as a touch panel or a hard button and performs displaying of an error notification, an instruction notification, or the like or operations such as a scan operation, a setting operation, or the like.

The PC/server terminal 101 displays an image generated by the image processing device 100. The PC/server terminal 101 further performs storage of a manuscript image generated by the image processing device 100, processing of optical character recognition (OCR), or the like and generates reusable content data. Note that a multi-crop process that may be performed by the image processing device 100 may be performed by the PC/server terminal 101. Moreover, the image processing device 100 and the PC/server terminal 101 can communicate with an external storage such as a cloud or a server and can transmit a stored image or metadata to the external storage. Note that, in the present embodiment, while a process in which the image processing device 100 stores a manuscript image, generates metadata after language estimation, and then transmits the metadata to the PC/server terminal 101 is described, the PC/server terminal 101 may have the same functions.

Further, the mobile terminal 103 is a smartphone or a tablet terminal having an operation unit, a wireless communication unit, and an application unit that causes a web browser to operate. In the system of the present embodiment, the mobile terminal 103 is used as a display terminal, an operation terminal, and a terminal for generating and storing content data as with the PC/server terminal 101. Note that the PC/server terminal 101 and the mobile terminal 103 may be configured to have any one of the function of displaying and operating and the function of generating metadata and generating and storing content data, or the like.

Figure 2:
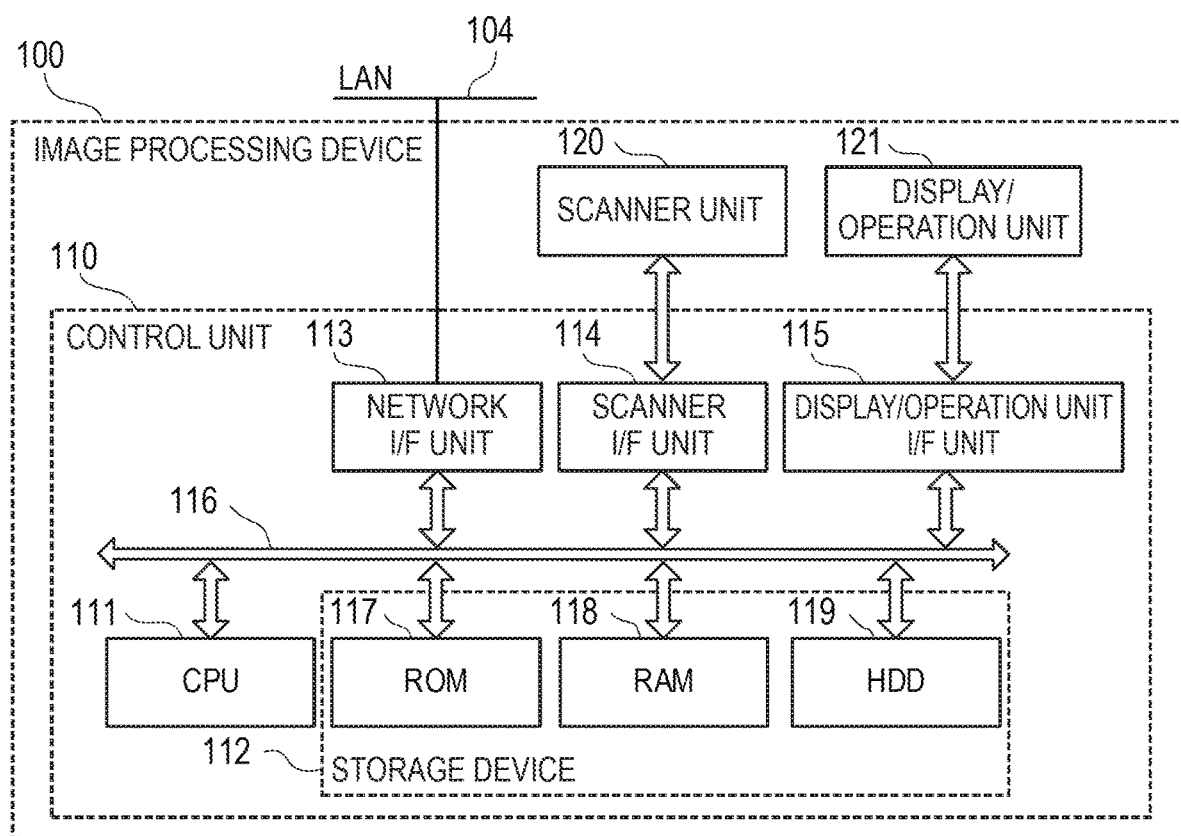
FIG. 2 is a diagram illustrating an example of a hardware configuration of an image processing device.

FIG. 2 is a diagram illustrating an example of a hardware configuration of the image processing device 100. The control unit 110 is formed of a CPU 111, a storage device 112, a network I/F unit 113, a scanner I/F unit 114, and a display/operation unit I/F unit 115, which are communicatively connected to each other via a system bus 116. The control unit 110 controls the operation of the overall image processing device 100. The CPU 111 reads a control program stored in the storage device 112 and performs various control such as reading control or transmission control. The storage device 112 stores and holds a program, an image, metadata, setting data, process result data, and the like. The storage device 112 is formed of a ROM 117 that is a nonvolatile memory, a RAM 118 that is a volatile memory, an HDD 119 that is a mass storage region, and the like.

The ROM 117 holds a control program or the like. When the CPU 111 reads and executes a control program stored in the ROM 117 or the HDD 119, processes of flowcharts of FIG. 3, FIG. 6, FIG. 8, FIG. 9, and FIG. 11 described later are implemented. The RAM 118 is used as a temporary storage region such as a main memory of the CPU 111 or a working area. The HDD 119 is an HDD having a mass storage region and is used as a storage region that stores an image, metadata, or the like. The network I/F unit 113 is an interface that connects the control unit 110 or the image processing device 100 to the LAN 104. The network I/F unit 113 transmits an image to an external device on the LAN 104, such as a PC/server terminal 101 and the mobile terminal 103, or receives various information from the external device on the LAN 104.

The scanner I/F unit 114 is an interface that connects a scanner unit 120 and the control unit 110 to each other. The scanner unit 120 generates a scanned image by reading an image on a manuscript stage and inputs the image to the control unit 110 via the scanner I/F unit 114. The display/operation unit I/F unit 115 is an interface that connects the display/operation unit 121 and the control unit 110 to each other. The display/operation unit 121 has a liquid crystal display unit having a touch panel function and a hard key such as number keys, a start button, or a cancel button. The start button is a button used for starting processes of copying and scanning. The cancel button is a button used for pausing or stopping a process that is being performed by the image processing device 100. In addition, while the image processing device 100 may have a printer unit or the like, the description thereof is omitted because the printer unit or the like are not used in the present embodiment.

As described above, the image processing device 100 according to the present embodiment can provide an image processing function by the hardware configuration illustrated in FIG. 2.

General Flowchart of OCR Processing

Figure 3:
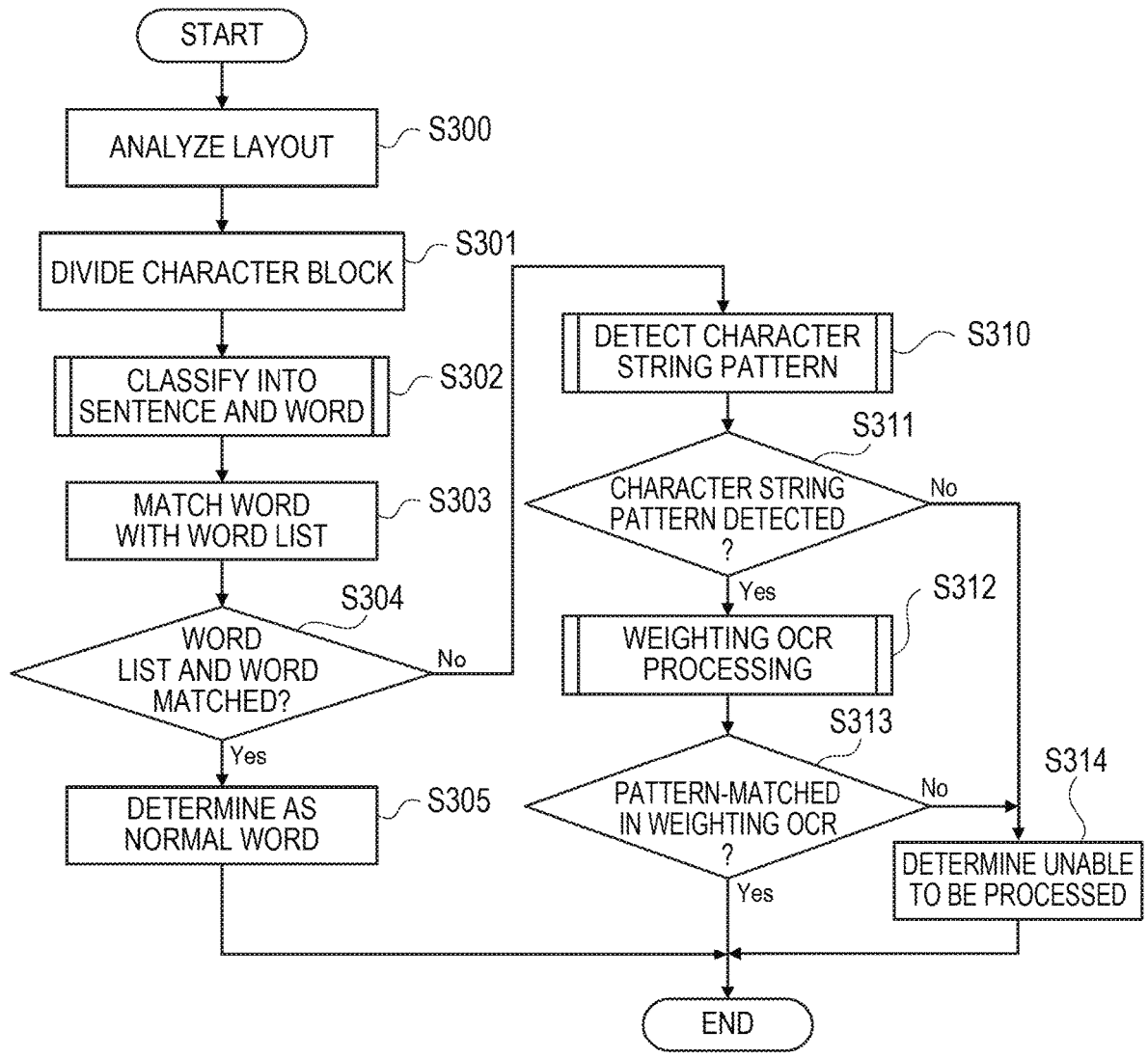
FIG. 3 is a flowchart illustrating an example of OCR processing in the image processing device.

FIG. 3 is a flowchart illustrating an example of OCR processing in the image processing device 100. The OCR processing is an example of character recognition processing to recognize a character from an image. Further, the flowchart of FIG. 3 is a flowchart illustrating an example of information processing of the image processing device 100.

In step S300, the CPU 111 first analyzes the layout of a manuscript image for OCR processing. In the layout analysis, it is estimated what meaning on the document the pixels on an image has in general. For example, the CPU 111 divides a coordinate region of a manuscript image into elements such as "character", "table", "drawing", "photograph", or "ruled line". Here, any scheme may be employed as long as a region that is "character" can be determined in particular.

When a layout analysis result is obtained by step S300, in step S301, the CPU 111 extracts a character region from the result and further divides the character region into character blocks. In general, in layout analysis, when a character region is divided, the character region is often divided into a mass such as a paragraph. Thus, division is performed such that the characters are gathered within a certain distance to form a block so that it is advantageous for the subsequent process. For example, this can be realized by using a histogram method or the like, and any scheme may be employed as long as a character block can be divided.

When a character block can be divided in step S301, the CPU 111 classifies the blocks into "sentence" and "word" in step S302. Details of the process of step S302 will be described later with reference to FIG. 4.

When character blocks are classified into sentences and words in step S302, the CPU 111 matches only the character block classified into words with a word list in step S303. The word list is a list of words registered in advance. The word list is an example of a word dictionary.

In step S304, the CPU 111 determines whether or not the character block matches the word list, that is, whether or not the character block matches words included in the word list. If the CPU 111 determines the character block matches the word list, the process proceeds to step S305.

In step S305, the CPU 111 assumes that the target word is a normal word and OCR is successful and ends the OCR processing. On the other hand, if the CPU 111 determines that the character block does not match the word list, the CPU 111 assumes that the character block may be ID or the like that is not registered in the word list, and the process proceeds to step S310.

In step S310, the CPU 111 detects a character string pattern. Details of the process of step S310 will be described later with reference to FIG. 6.

In step S311, the CPU 111 determines whether or not a character string pattern is detected in the detection of a character string pattern of step S310. If the CPU 111 determines that a character string pattern is detected, the process proceeds to step S312. If the CPU 111 determines that a character string pattern is not detected, the process proceeds to step S314.

In step S312, the CPU 111 performs weighting OCR processing along the detected character string pattern. Details of the process of step S312 will be described later with reference to FIG. 11.

In step S313, the CPU 111 determines whether or not a result that matches the character string pattern is detected by the weighting OCR in step S312. If the CPU 111 determines a result that matches the character string pattern is detected by weighting OCR, the CPU 111 ends the OCR processing. If the CPU 111 determines that a result that matches the character string pattern is not detected by weighting OCR, the process proceeds to step S314.

In step S314, the CPU 111 determines that the character string pattern is unable to be processed even in the present embodiment. The CPU 111 then ends the OCR processing.

Execution Flow of "Classification into Sentence and Word (Step S302)"

Figure 4:
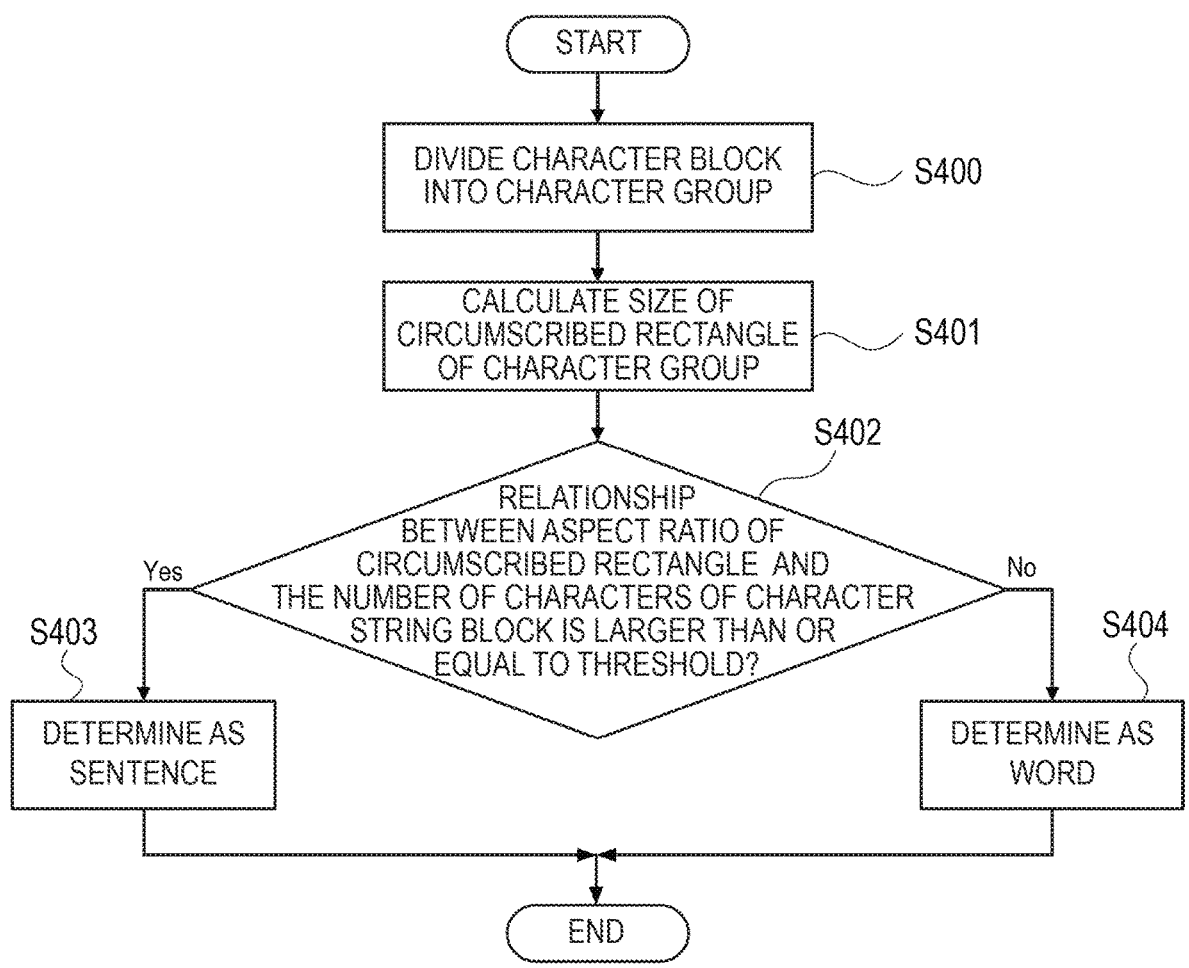
FIG. 4 is a detailed flowchart of step S302 of FIG. 3.

The process of a detailed flowchart of step S302 of FIG. 3 will be described with reference to FIG. 4.

In step S400, the CPU 111 divides the character block divided in step S301 into character groups in accordance with the distance therebetween. In general, when a manuscript written in horizontally is a target, the division into a plurality of character groups can be performed in accordance with the distribution of a series of character spacings in horizontal direction.

Figure 5:
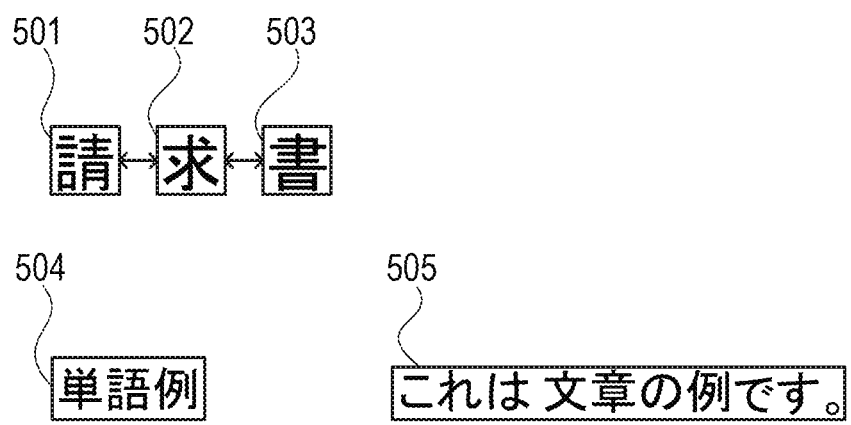
FIG. 5 is a diagram illustrating an example of words and a sentence.

As an example, an example of words and a sentence is illustrated in FIG. 5. For example, in elements 504 and 505, while there is substantially no spacing between characters and the characters are continuous in each group, each character spacing of elements 501 to 503 is wider than the character spacing of the elements 504 and 505. However, even with the positions of characters being spread but continuous at equal character spacings, the elements 501 to 503 are determined as a mass of character group. Various methods can be employed for such a method of group division, and the details thereof do not matter in the present embodiment.

In step S401, the CPU 111 calculates a circumscribed rectangle including the element character block from the divided character group in such a way. In step S402, the CPU 111 determines whether or not the relationship between the aspect ratio and the number of characters is larger than or equal to a threshold from the size of the circumscribed rectangle. If the CPU 111 determines that the relationship is larger than or equal to the threshold, the process proceeds to step S403. If the CPU 111 determines that the relationship is not larger than or equal to the threshold, the process proceeds to step S404.

In step S403, the CPU 111 determines that the corresponding character group is "sentence".

In step S404, the CPU 111 determines that the corresponding character group is "word".

For example, the elements 504 and 501 to 503 of FIG. 5 are examples determined as a word. The element 505 is an example determined as a sentence.

Execution Flow of "Detection of Character String Pattern (Step S310)"

Figure 6:
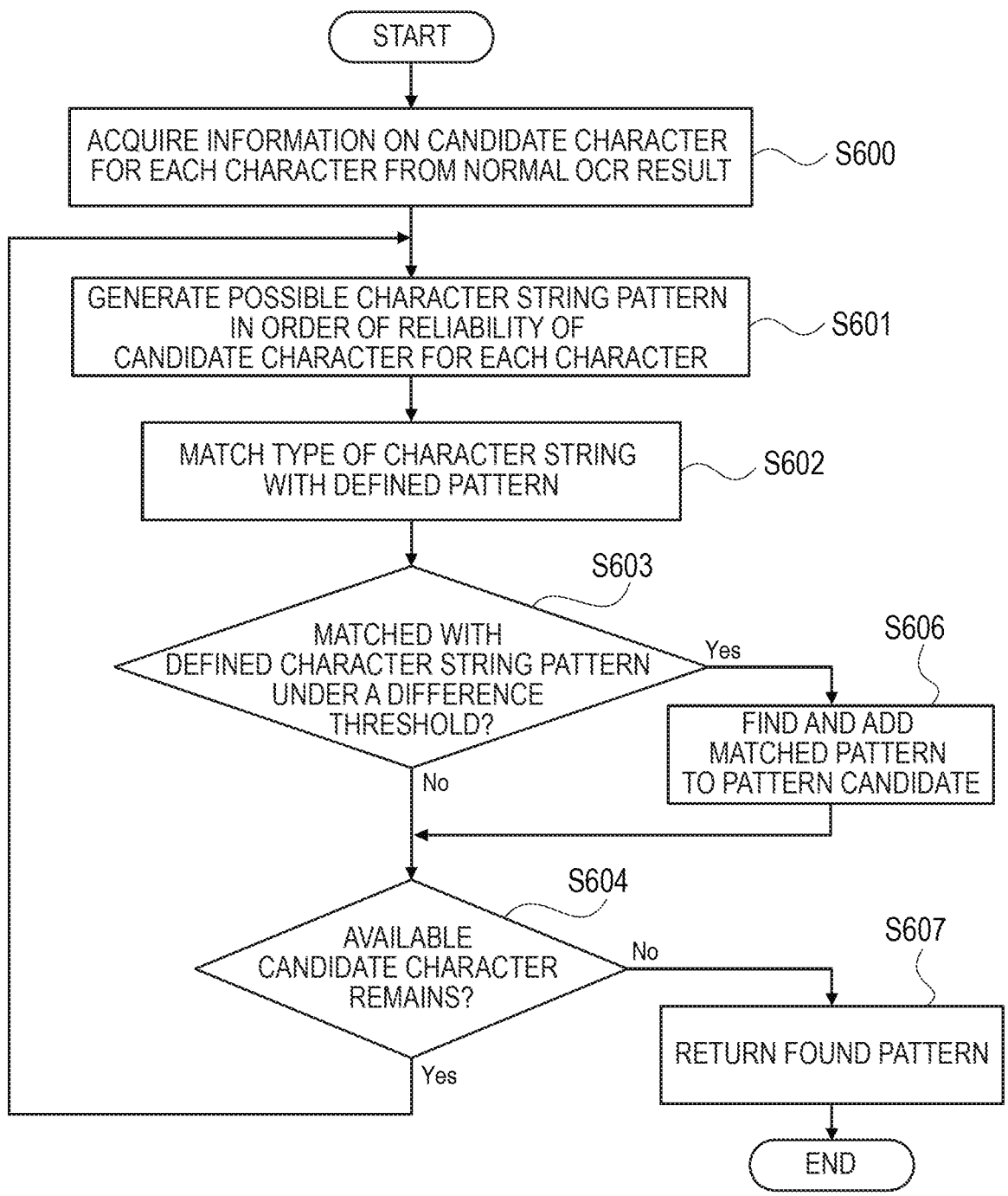
FIG. 6 is a detailed flowchart of step S310 of FIG. 3.

The process of a detailed flowchart of step S310 of FIG. 3 will be described with reference to FIG. 6.

The CPU 111 assumes that a word that fails to meet "word matching" in step S304 is a word that is unable to be registered as with ID or the like and detects a character string pattern.

In step S600, the CPU 111 acquires, from a result obtained by first performing typical OCR (general character OCR having no special bias) on a character group, "OCR candidate character" that is generally calculated when OCR is performed on each character.

Figure 7:
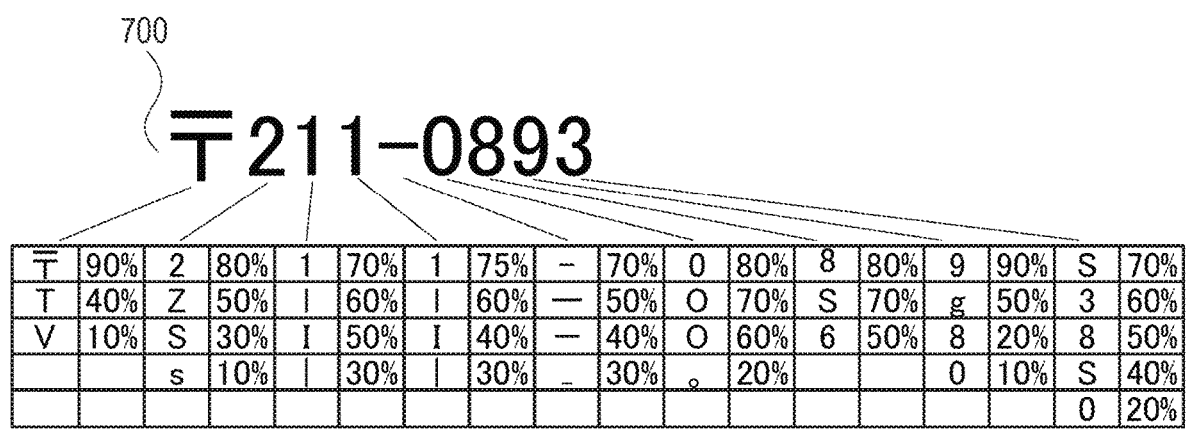
FIG. 7 is a diagram illustrating an OCR result and reliability.

As an example, the OCR candidate character is obtained as illustrated in FIG. 7. For an image character string 700 that is an OCR target, as an OCR calculation result for each character, a character code considered as a candidate is generally output together with reliability (probability to be considered as a correct answer by OCR processing). For example, for a character "2" in an image, possible characters are "2", "Z", "S", and "s" in the OCR processing, and the probabilities thereof are "80%", "50%", "30%", and "10%", respectively.

In step S601, the CPU 111 generates a possible character string pattern from the above information.

Figure 8:
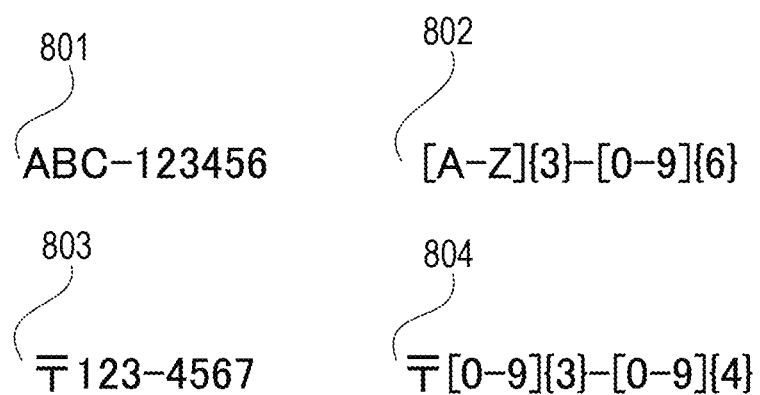
FIG. 8 is a diagram illustrating an example of character string patterns.

Here, "character string pattern" may be any expression and may be considered as expression by using regular expression as FIG. 8, for example. For example, when generalized, a specific ID character string 801 can be expressed as an element 802 as regular expression. Similarly, a postal code character string 803 can be generalized and expressed as an element 804 as regular expression.

Step S601 intends to estimate a generalized character string pattern to which the character group may belongs from a result obtained by OCR of a certain character group.

For example, when the result of FIG. 7 is mapped in numerical % order of reliability, FIG. 9 is obtained, and when the contents are replaced with regular expression for each type of a character (number, alphabet), filled from the top, and patterned, FIG. 10 is obtained. When this is simplified, the top level (top column) of each OCR candidate can be expressed as "T[0-9]{3}-[0-9]{3}[A-Z]". Compared to the element 804 of FIG. 8, only the last "[A-Z]" is different.

Accordingly, in step S602, the CPU 111 compares a registered character string pattern as described above (definition as illustrated in FIG. 8) with the pattern estimated in step S601 from the OCR result. The registered character string pattern is an example of an arrangement pattern of a character type defined in advance. Further, in step S603, the CPU 111 determines whether or not a difference is less than or equal to a threshold as a result of comparison. If the CPU 111 determines that the difference is less than or equal to the threshold, the process proceeds to step S606. If the CPU 111 determines that the difference is not less than or equal to the threshold, the process proceeds to step S604. The case where the difference is less than or equal to the threshold corresponds to an example in which patterns are similar. In step S603, the process determined as Yes is an example of a process when a pattern that is similar to an arrangement pattern of a character type defined in advance is present in a character string resulted from a character recognition process that does not match words of a word dictionary.

In step S606, the CPU 111 assumes that a matched pattern is found and adds the matched pattern to a pattern candidate. After step S603 or after step S606, in step S604, the CPU 111 determines whether or not the candidate character that is available for pattern generation still remains. What is performed here is to inspect whether or not a point at which a pattern of candidate characters in a lower level changes still remains from the top column in FIG. 10. For example, with a decrease to a rank of 70% (the third column from the top), since the pattern becomes "T[0-9]{3}-[A-Z]{2}[0-9][A-Z]" and still changes, it can be said that an available candidate remains.

If the CPU 111 determines that the available candidate character remains, a process returns to step S601 in order to generate a new character string pattern. If the CPU 111 determines that no available candidate character remains, the process proceeds to step S607.

In step S607, the CPU 111 returns a pattern candidate to a calling side.

Execution Flow of "Weighting OCR Processing (Step S312)"

The process of a detailed flowchart of step S310 of FIG. 3 will be described with reference to FIG. 11. In step S1100, the CPU 111 selects one pattern from character string patterns detected in step S310. The CPU 111 generates, from the pattern, a designated character type that limits a calculation result of OCR for each character. This is to bias the OCR calculation so as to output only the result "0123456789" as an OCR result in response to "[0-9]", for example. This is referred to as "character type limitation OCR", and the details of the implementing method is not limited. For example, the feature amount comparison process for OCR can be restricted, or a method of filtering a candidate character of an OCR result can be taken. In step S1101, the CPU 111 performs character type limitation and again performs OCR on each character. At this time, the CPU 111 may perform a process of improving accuracy of OCR processing, for example, using a larger feature amount than the feature amount used for typical OCR or the like. The process in step S1101 is an example of a control process of changing a character recognition process for a character string based on a pattern.

In step S1102, the CPU 111 determines whether or not all the levels of OCR reliability for respective characters are larger than or equal to a threshold (for example, 90% or the like) as a result of performing OCR again. When the CPU 111 determines that all the levels of OCR reliability for respective characters are larger than or equal to the threshold, the process proceeds to step S1106. If the CPU 111 determines that all the levels of OCR reliability for respective characters are not larger than or equal to the threshold, the process proceeds to step S1104.

In step S1106, the CPU 111 fixes an OCR result obtained from step S1101 as the most probable OCR result for the corresponding character group. The CPU 111 then ends the weighting OCR processing.

In step S1104, the CPU 111 determines whether or not a character string pattern to be a candidate still remains. If a character string pattern to be a candidate still remains, the CPU 111 causes the process to return to step S1100, selects a new character string pattern, and repeats the process from step S1100. If there is no other character string pattern to be a candidate, the CPU 111 causes the process to proceed to step S1107. In step S1107, the CPU 111 assumes that finally the pattern matching failed. The CPU 111 then ends the weighting OCR processing.

As described above, according to the present embodiment, it is possible to perform character recognition on a character string such as ID having a high one-time-only nature at higher accuracy.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-132818, filed Jul. 18, 2019, which is hereby incorporated by reference herein in its entirety.

What is claimed is:

1. An information processing device comprising:
at least one memory that stores a program; and
at least one processor that executes the program to perform instructions for:
determining whether or not a character string of candidate characters obtained by executing a first character recognition process for an image matches with a word of a word dictionary;
generating a plurality of character string patterns based on the candidate characters obtained by executing the first character recognition process for the image;
determining whether or not at least one of the generated character string patterns match with at least one of predefined arrangement patterns of character types; and
in a case where it is determined that the character string of the candidate characters does not match with the word of the word dictionary and where it is determined that at least one of the generated character string patterns match with at least one of the predefined arrangement patterns, executing at least one second character recognition process in which character type limitation corresponding to each of the matched at least one of the predefined arrangement patterns is performed.

2. An information processing method comprising steps of:
determining whether or not a character string of candidate characters obtained by executing a first character recognition process for an image matches with a word of a word dictionary;
generating a plurality of character string patterns based on the candidate characters obtained by executing the first character recognition process for the image;
determining whether or not at least one of the generated character string patterns match with at least one of predefined arrangement patterns of character types; and
in a case where it is determined that the character string of the candidate characters does not match with the word of the word dictionary and where it is determined that at least one of the generated character string patterns match with at least one of the predefined arrangement patterns, executing at least one second character recognition process in which character type limitation corresponding to each of the matched at least one of the predefined arrangement patterns is performed.

3. A non-transitory computer readable storage medium storing a program for causing a processor to perform instructions for:
    determining whether or not a character string of candidate characters obtained by executing a first character recognition process for an image matches with a word of a word dictionary;
    generating a plurality of character string patterns based on the candidate characters obtained by executing the first character recognition process for the image;
    determining whether or not at least one of the generated character string patterns match with at least one of predefined arrangement patterns of character types; and
    in a case where it is determined that the character string of the candidate characters does not match with the word of the word dictionary and where it is determined that at least one of the generated character string patterns match with at least one of the predefined arrangement patterns, executing at least one second character recognition process in which character type limitation corresponding to each of the matched at least one of the predefined arrangement patterns is performed.

4. The information processing device according to claim 1, wherein the at least one processor executes the program to further perform instructions for:
    in a case where levels of OCR reliability of respective characters obtained by executing the at least one second character recognition process for the image are larger than or equal to a threshold, fixing the characters obtained by executing the second character recognition process for the image.

5. The information processing method according to claim 2, further comprising the step of:
    in a case where levels of OCR reliability of respective characters obtained by executing the at least one second character recognition process for the image are larger than or equal to a threshold, fixing the characters obtained by executing the at least one second character recognition process for the image.

6. The non-transitory computer readable storage medium according to claim 3, wherein the stored program causes the processor to further perform an instruction for:
    in a case where levels of OCR reliability of respective characters obtained by executing the at least one second character recognition process for the image are larger than or equal to a threshold, fixing the characters obtained by executing the at least one second character recognition process for the image.

* * * * *